US012193086B2

(12) United States Patent
Suga

(10) Patent No.: US 12,193,086 B2
(45) Date of Patent: *Jan. 7, 2025

(54) COMMUNICATION APPARATUS, CONTROL METHOD, AND STORAGE MEDIUM

(71) Applicant: CANON KABUSHIKI KAISHA, Tokyo (JP)

(72) Inventor: Kenichiro Suga, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,971

(22) Filed: Jun. 3, 2022

(65) Prior Publication Data
US 2022/0304086 A1 Sep. 22, 2022

Related U.S. Application Data

(63) Continuation of application No. 16/436,057, filed on Jun. 10, 2019, now Pat. No. 11,382,154, which is a
(Continued)

(30) Foreign Application Priority Data

May 20, 2016 (JP) ................................ 2016-101939

(51) Int. Cl.
H04W 76/14 (2018.01)
H04W 4/70 (2018.01)
(Continued)

(52) U.S. Cl.
CPC ............ H04W 76/14 (2018.02); H04W 4/70 (2018.02); H04W 76/10 (2018.02); H04W 76/15 (2018.02);
(Continued)

(58) Field of Classification Search
CPC .......... H04N 1/32765; H04N 1/00315; H04W 76/14; H04W 84/12; H04W 76/15;
(Continued)

(56) References Cited

U.S. PATENT DOCUMENTS 10,342,057 B2 7/2019 Suga
2006/0050729 A1 3/2006 Chen et al.
(Continued)

FOREIGN PATENT DOCUMENTS

CN 103780672 A 5/2014
CN 104412245 A 3/2015
(Continued)

OTHER PUBLICATIONS

European Search Report for EP 17 00 0770 dated Oct. 19, 2017, 10 pgs.
(Continued)

Primary Examiner — Omer S Mian
(74) Attorney, Agent, or Firm — Carter, DeLuca & Farrell LLP

(57) ABSTRACT

A communication apparatus has a communication function for performing wireless communication using one of a first mode of performing first communication with a partner apparatus via another apparatus, a second mode of performing second communication with the partner apparatus not via another apparatus, and a third mode of concurrently performing the first communication and the second communication. When the third mode is the operation mode of the communication function, the communication apparatus controls the communication function so as to activate a function of the second communication after executing processing to establish a connection for the first communication. When the connection has not been established even after a predetermined time has elapsed since the start of connection pro-
(Continued)

cessing for the first communication, the function for the second communication is activated even if the connection for the first communication has not been established.

20 Claims, 8 Drawing Sheets

Related U.S. Application Data continuation of application No. 15/596,407, filed on May 16, 2017, now Pat. No. 10,342,057.

(51) Int. Cl.
  *H04W 76/10* (2018.01)
  *H04W 76/15* (2018.01)
  *H04W 84/12* (2009.01)
  *H04N 1/00* (2006.01)
  *H04N 1/327* (2006.01)

(52) U.S. Cl.
  CPC ........ *H04W 84/12* (2013.01); *H04N 1/00307* (2013.01); *H04N 1/00315* (2013.01); *H04N 1/32765* (2013.01); *H04N 2201/0094* (2013.01)

(58) Field of Classification Search
  CPC ..... H04W 76/10; H04W 48/20; H04W 8/005; H04W 48/16
  See application file for complete search history.

(56) References Cited

U.S. PATENT DOCUMENTS

| | | | |
|---|---|---|---|
| 2007/0008922 A1 | 1/2007 | Abhishek et al. | |
| 2012/0026931 A1 | 2/2012 | Wentink | |
| 2012/0178429 A1 | 7/2012 | Camps Mur | |
| 2013/0142170 A1* | 6/2013 | Sakai | H04W 88/06 370/331 |
| 2014/0112324 A1 | 4/2014 | Kwon | |
| 2014/0320909 A1* | 10/2014 | Shimazaki | H04W 8/005 358/1.15 |
| 2015/0002892 A1 | 1/2015 | Maeda | |
| 2015/0215939 A1 | 7/2015 | Kikkawa et al. | |
| 2015/0334759 A1* | 11/2015 | Hiramatsu | H04W 48/16 370/338 |
| 2016/0081139 A1 | 3/2016 | Akhavan-Saraf et al. | |
| 2017/0105222 A1 | 4/2017 | Nieman et al. | |

FOREIGN PATENT DOCUMENTS

| | | | |
|---|---|---|---|
| JP | 2014082685 A | 5/2014 |
| JP | 2015142243 A | 8/2015 |

OTHER PUBLICATIONS

Alcatel-Lucent et al.: FS_ProSe: Overview:, 3GPP Draft; S1-120030 FS_Prose Overview, 3rd Generation Partnership Project (3GPP), Mobile Competence Centre, vol. SA WG1, Feb. 6, 2012, 2 pgs.

Singapore Search Report for corresponding Application No. 10201703739T dated Dec. 18, 2017 (8 pgs).

Notification of Reason for Refusal issued by the Korean Intellectual Property Office on Jan. 16, 2020 in corresponding Korean Patent Application No. 10-2017-0058391 with English translation.

Notification of the First Office Action issued by the State Intellectual Property Office of the People's Republic of China on Mar. 2, 2020 in corresponding CN Patent Application No. 201710356444.2, with English translation.

* cited by examiner

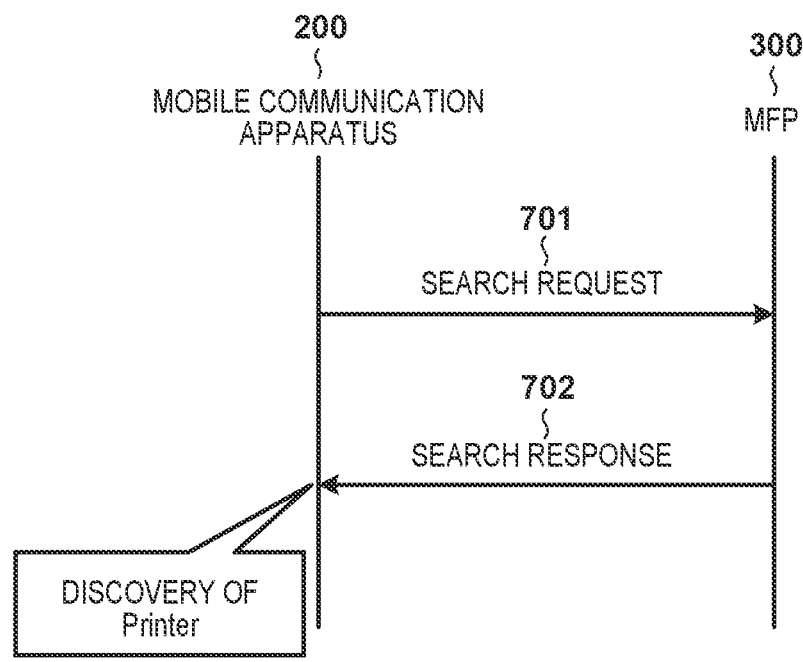
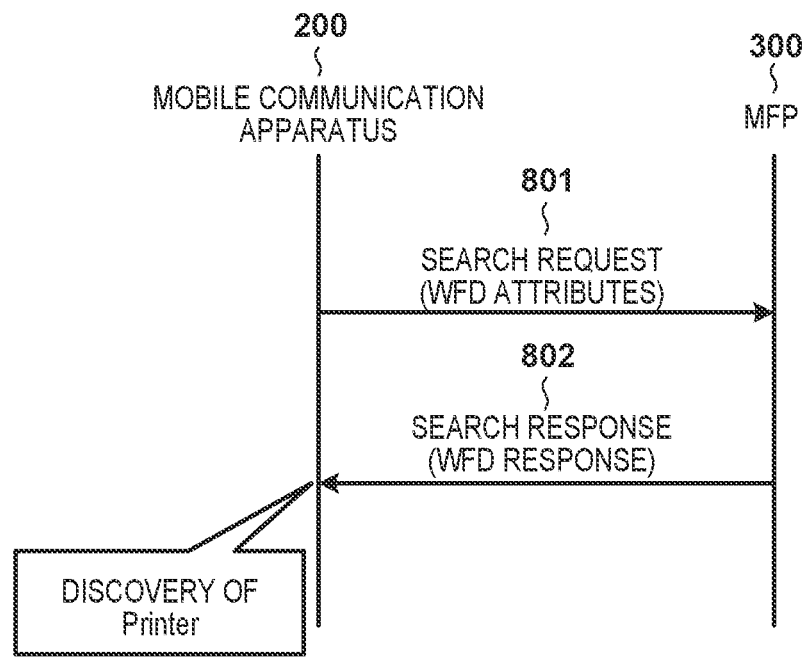

COMMUNICATION APPARATUS, CONTROL METHOD, AND STORAGE MEDIUM

CROSS REFERENCE TO RELATED APPLICATIONS

The present application is a continuation of U.S. patent application Ser. No. 16/436,057, filed on Jun. 10, 2019, which is a continuation of U.S. patent application Ser. No. 15/596,407, filed May 16, 2017, which claims the benefit of and priority to Japanese Patent Application No. 2016-101939, filed May 20, 2016, each of which are hereby incorporated by reference herein in their entirety.

BACKGROUND OF THE INVENTION

Field of the Invention

The present invention generally relates to a communication apparatus, and a control method, particularly to a technique for setting wireless communication.

Description of the Related Art

As a wireless connection mode that is used when a communication apparatus is to be connected to a partner apparatus, either an infrastructure mode of wirelessly connecting to the partner apparatus via another apparatus such as an access point (AP) or a peer-to-peer (P2P) mode of wirelessly connecting to the partner apparatus directly can be used. Note that the P2P mode includes a mode in which the communication apparatus or the partner apparatus operates as a base station such as an access point and performs wireless connection by handling the other apparatus as a terminal accommodated by the base station.

Wi-Fi Direct® is one of the specifications developed for P2P mode communication. In Wi-Fi Direct, two or more wireless LAN terminals for communicating in the P2P mode each play either of a role called a Group Owner (GO) or a role called a Client (CL). Note that a GO operates like an AP, and a CL operates like a station (STA) which connects to the AP. Note that whether the communication apparatus or the partner apparatus is to operate as a GO is decided by a sequence called a Group Owner Negotiation. This eliminates the need for a conventional dedicated device as an access point, and direct communication between the communication apparatus and the partner apparatus is possible. In general, when a communication apparatus is to operate as an STA or a CL, the decision of a channel to be used is led by an AP which transmits a search response command in response to a search request command from the communication apparatus. Additionally, when a communication apparatus is to operate as a GO, the communication apparatus decides the channel to be used by comparing the channel information of the CL obtained by the Group Owner Negotiation and channels that the communication apparatus can use.

The above-described wireless communications by the infrastructure mode and the P2P mode can be simultaneously (concurrently) executed in a single apparatus. For example, the communication apparatus can serve as an STA and perform wireless connection with an access point on one hand but can also function as a GO in the P2P mode to perform wireless connection with a partner apparatus functioning as a CL. In this case, the communication apparatus can perform wireless connection by using concurrent wireless interfaces via two distinct wireless channels serving as the wireless interfaces. However, when communication is performed by simultaneously allocating a plurality of channels using a single wireless IC chip, the apparatus arrangement and processing become complicated. Thus, in practice, a common channel may be used for the aforementioned two modes when performing concurrent communication.

Japanese Patent Laid-Open No. 2014-082685 discloses a communication apparatus that connects to a first wireless network formed by a base station and generates a second wireless network in which direct communication with another communication apparatus is possible. Note that in Japanese Patent Laid-Open No. 2014-082685, the communication apparatus determines a channel to be used in the first wireless network and generates the second wireless network by using the same channel.

In the technique of Japanese Patent Laid-Open No. 2014-082685, when it is immediately after the activation of the base station (access point) forming the first wireless network or when the power of the base station is turned off, the connection of the first wireless network may require time until it is established or the connection may not be established. In such a case, the processing to generate the second wireless network can be prolonged or it may become impossible to generate the second wireless network since a channel cannot be established.

SUMMARY OF THE INVENTION

The present invention reduces the influence of the connection processing of one mode on the connection processing of another mode in a communication apparatus capable of communicating in a plurality of modes.

According to one aspect of the present invention, there is provided a communication apparatus comprising: a communication unit configured to perform wireless communication by using one of a first mode of performing first communication with a partner apparatus via another apparatus, a second mode of performing second communication with the partner apparatus without not via another apparatus, and a third mode of concurrently performing the first communication and the second communication; and a control unit configured to control the first communication and the second communication of the communication unit, wherein when an operation mode of the control unit is the third mode, the control unit controls the communication unit so as to activate a function for the second communication after executing processing to establish a connection for the first communication, and when the connection has not been established even after a predetermined time has elapsed since the start of connection processing for the first communication, the control unit controls the communication unit so as to activate the function for the second communication even if the connection for the first communication has not been established.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 7 is a sequence chart showing an example of the procedure of the wireless connection processing of a software AP mode;

FIG. 8 is a sequence chart showing an example of the procedure of the wireless connection processing of a WFD mode;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(System Configuration)

Figure 1:
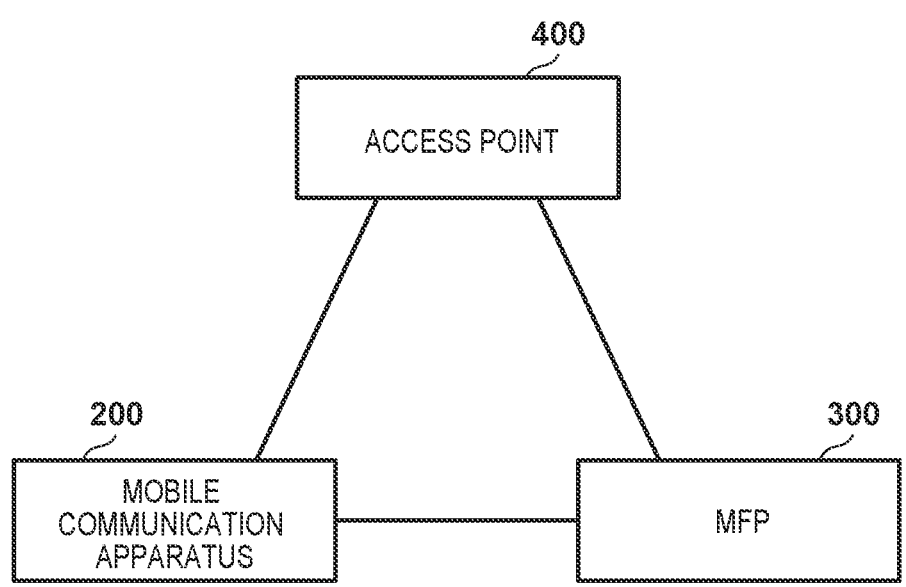
FIG. 1 is a view showing an example of the configuration of a wireless communication system.

FIG. 1 shows an example of the configuration of a wireless communication system according to this embodiment. The wireless communication system includes, for example, a mobile communication apparatus, a printing apparatus (MFP: Multi-Function Peripheral), and an access point (AP). These apparatuses are all communication apparatuses that include communication functions, respectively. However, the present invention is not limited to this. An apparatus other than these apparatuses may be included in addition to or in place of these respective apparatuses shown in FIG. 1.

A mobile communication apparatus 200 is, for example, a portable communication apparatus which has a wireless LAN (WLAN) communication function. Here, assume that data (packet) communication in a wireless LAN system complying with e.g., the IEEE 802.11 standard series will be performed by the wireless LAN communication function. The mobile communication apparatus 200 can use the wireless LAN communication function to perform communication based on Wi-Fi Direct (WFD), communication by a software access point mode, or communication by an infrastructure mode. Note that the software access point mode is also called a software AP mode, and the infrastructure mode is also called an "infra" mode.

Note that the mobile communication apparatus 200 may have a wireless communication function other than for a wireless LAN complying with the IEEE 802.11 standard series. For example, the mobile communication apparatus 200 may have a wireless LAN function that complies with a standard other than the IEEE 802.11 standard series or have a communication function other than for a wireless LAN. However, it is assumed that the mobile communication apparatus 200 can operate in one of a first mode of performing wireless communication with a partner apparatus via another apparatus and a second mode of performing wireless communication with a partner apparatus not via another apparatus. It is also assumed that the mobile communication apparatus 200 can simultaneously perform wireless communications by the first mode and the second mode. The mobile communication apparatus 200 can be, for example, a personal information terminal such as a PDA (Personal Digital Assistant), a mobile phone, or a digital camera.

The print apparatus (MFP 300) can have a communication function that performs wireless communication with the mobile communication apparatus 200. The print apparatus can also have other functions such as a scanning function (scanner), a FAX function, and a telephone function. Here, the wireless communication function is a function corresponding to the communication function of the aforementioned mobile communication apparatus 200. That is, assume that, for example, in a case in which the mobile communication apparatus 200 has a wireless LAN communication function, the MFP 300 has a wireless LAN communication function that complies with the same standard. In this embodiment, the MFP 300 has a scanning function in addition to the print function, but the present invention is not limited to this. The MFP 300 may have only the print function or have a function unrelated to image processing such as printing.

Note that the MFP 300 can also operate, in the same manner as the mobile communication apparatus 200, in one of a first mode of performing wireless communication with a partner apparatus via another apparatus and a second mode of performing wireless communication with a partner apparatus not via another apparatus. Assume also that the MFP 300 can simultaneously perform wireless communication by the first mode and the second mode.

An access point 400 has a wireless LAN communication function and relays communication between communication apparatuses functioning as wireless LAN stations (may also be referred to as clients hereinafter) that have been permitted, by the access point, to connect to the access point itself. In addition, the access point 400 can also relay communication between an aforementioned communication apparatus and an apparatus (for example, an apparatus directly connected to a network by a LAN cable or the like) connectable via the network to which the access point 400 is connected. A communication apparatus (station) which is present around the access point 400 can perform communication by the infrastructure mode via the access point 400. Note that if the mobile communication apparatus 200 is to communicate with a partner apparatus via another apparatus using a communication function which is not the wireless LAN, the access point 400 can be replaced with the other apparatus.

The mobile communication apparatus 200 and the MFP 300 can use their respective wireless LAN communication functions to perform wireless communication by the infrastructure mode via the access point 400. The mobile communication apparatus 200 and the MFP 300 can also perform wireless communication in a peer-to-peer mode (P2P mode) in accordance with Wi-Fi Direct or the like. Note that, the mobile communication terminal apparatus 200 and the MFP 300 can execute processing corresponding to a plurality of print services via a wireless LAN, as will be described later.

(Apparatus Arrangement)

Figure 2:
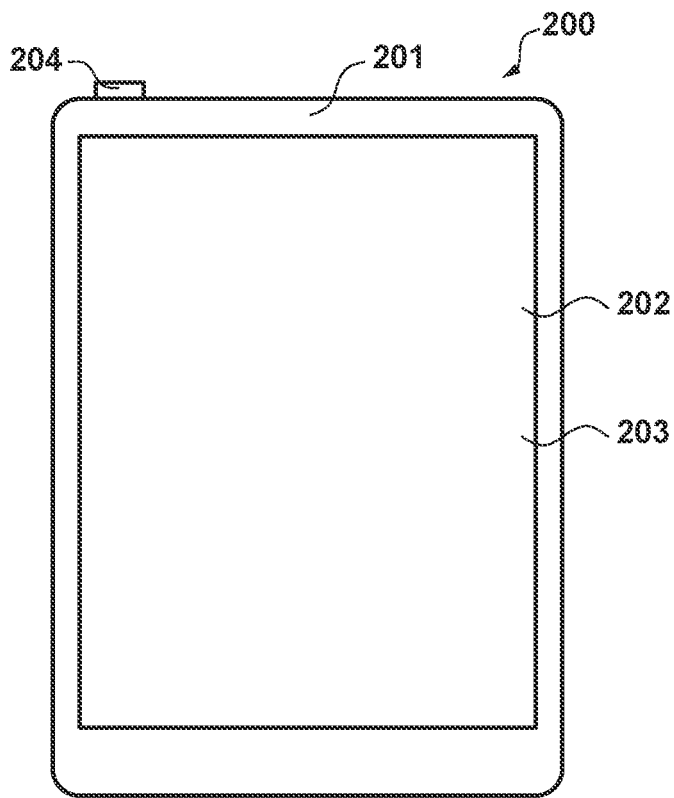
FIG. 2 is a view showing an example of the outer appearance of a mobile communication apparatus.

FIG. 2 shows an example of the outer appearance of the mobile communication apparatus 200. This embodiment will describe a case in which the mobile communication apparatus 200 is a smartphone. The smartphone is a multifunction mobile phone which incorporates a plurality of functions such as a camera, a web browser, and an email function. However, the mobile communication apparatus 200 need not be a smartphone. That is, the mobile communication apparatus 200 according to this embodiment can be replaced by an arbitrary communication apparatus incorporating at least some of the functions to be described below.

The mobile communication apparatus 200 includes, for example, a touch panel integrating a display unit 202 and an operation unit 203 and can include a bezel 201 portion that fixes or protects the touch panel. Note that an antenna for performing communication by the wireless LAN can be provided on the back side of the bezel 201, and the mobile communication apparatus 200 can perform communication using this antenna and a wireless communication circuit. The display unit 202 and the operation unit 203 can be, for example, a touch panel display having an LCD display mechanism. For example, the display unit 202 displays button icons and a software keyboard, and the operation unit 203 can detect an operation event when a user touches the icons and the keyboard. A power key 204 is a hard key used to accept an operation to turn on/off the power.

Figure 3:
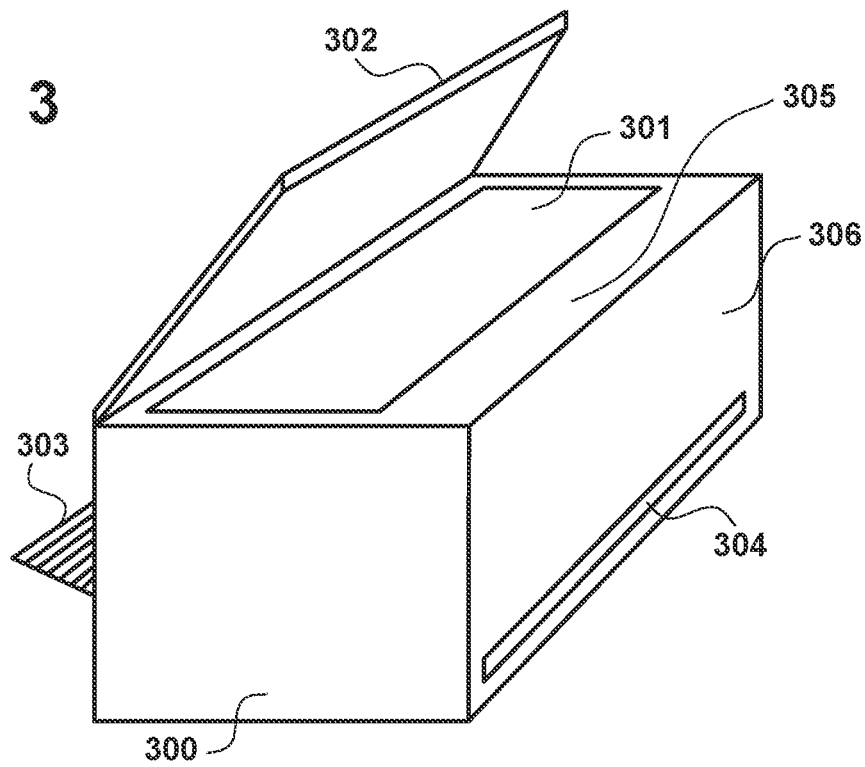
FIG. 3 is a view showing an example of the outer appearance of an MFP.

FIG. 3 shows an example of the outer appearance of the MFP 300. In FIG. 3, a document table 301 is a glass-like transparent table on which a document to be scanned by a scanner (scanning unit) is placed. A document cover 302 is a cover used to press a document when the scanner scans the document and to prevent external leakage of light from a light source, with which the document is irradiated at the time of scanning. A printing paper insertion port 303 is an insertion port to supply paper sheets of various sizes used for printing into the MFP 300. Paper sheets set on the printing paper insertion port 303 are conveyed one by one to a printing unit and are discharged from a printing paper discharge port 304 after printing is performed by the printing unit. An operation display unit 305 is formed by including keys such as character input keys, a cursor key, a decision key, and a cancel key, an LED (Light Emitting Diode), and an LCD (Liquid Crystal Display). The user can perform various settings and activate the various functions of the MFP via the operation display unit 305. The operation display unit 305 may be formed by a touch panel. A housing 306 houses a circuit, a print mechanism, and the like forming the MFP 300. An antenna for communicating by the wireless LAN and a wireless communication circuit are also housed in the housing.

Figure 4A:
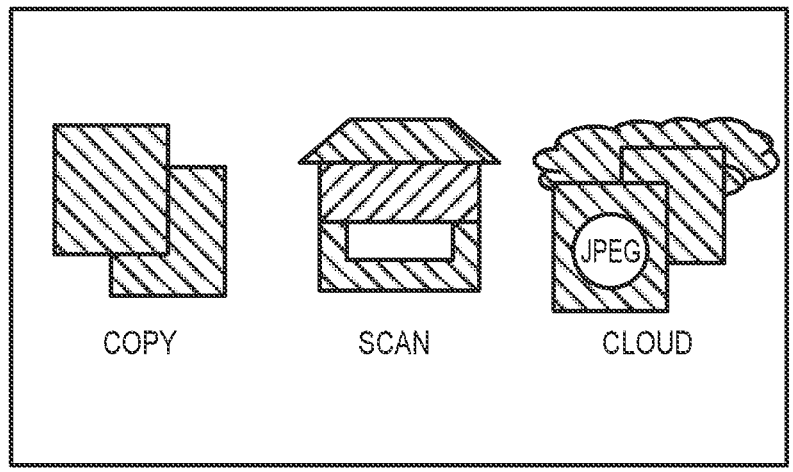
FIGS. 4A to 4C are views each showing an example of an operation display unit of the MFP.
Figure 4B:
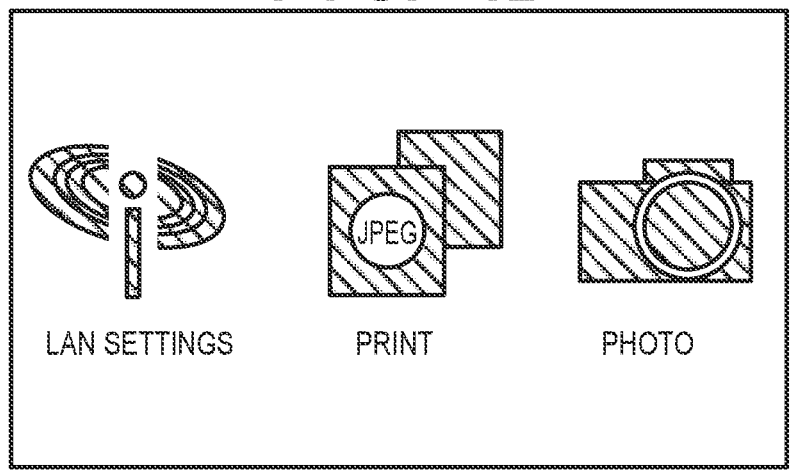
Figure 4C:
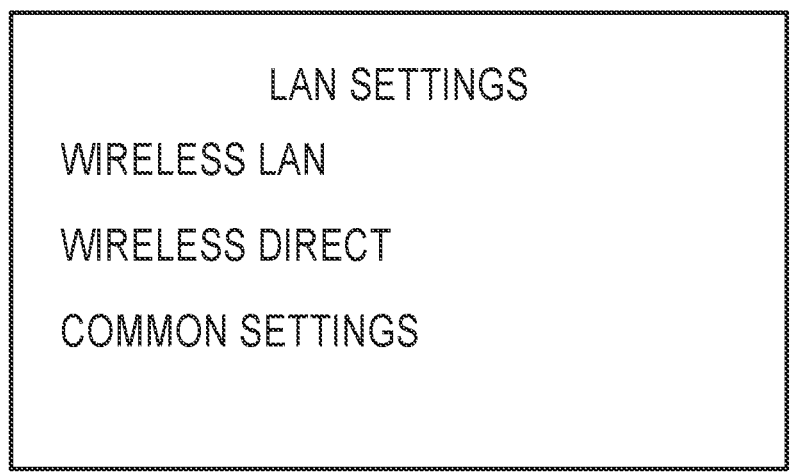

FIGS. 4A to 4C each schematically show an example of a screen which is displayed on the operation display unit 305 of the MFP. FIG. 4A is a home screen that shows a state (idle state) in which the MFP is turned on but no operation such as printing or scanning is performed. By accepting a key operation or a touch panel operation made by the user in this state, the MFP can shift to executing processes related to displaying a menu, various settings, or functions for copying, scanning, or a cloud function using Internet communication. The operation display unit 305 can seamlessly display, from the home screen of FIG. 4A, a function different from that of FIG. 4A by accepting the key operation or the touch panel operation made by the user. FIG. 4B is such an example and shows an example of a screen in which it is possible to execute a print or a photo function or change the LAN settings. FIG. 4C is an example of a screen which is displayed when the operation display unit 305 accepts a LAN setting selection in the screen of FIG. 4B. Changes to various kinds of LAN settings such as the setting to enable/disable the infrastructure mode (wireless LAN) or the setting to enable/disable the WFD mode (wireless direct) can be executed from this screen.

Figure 5:
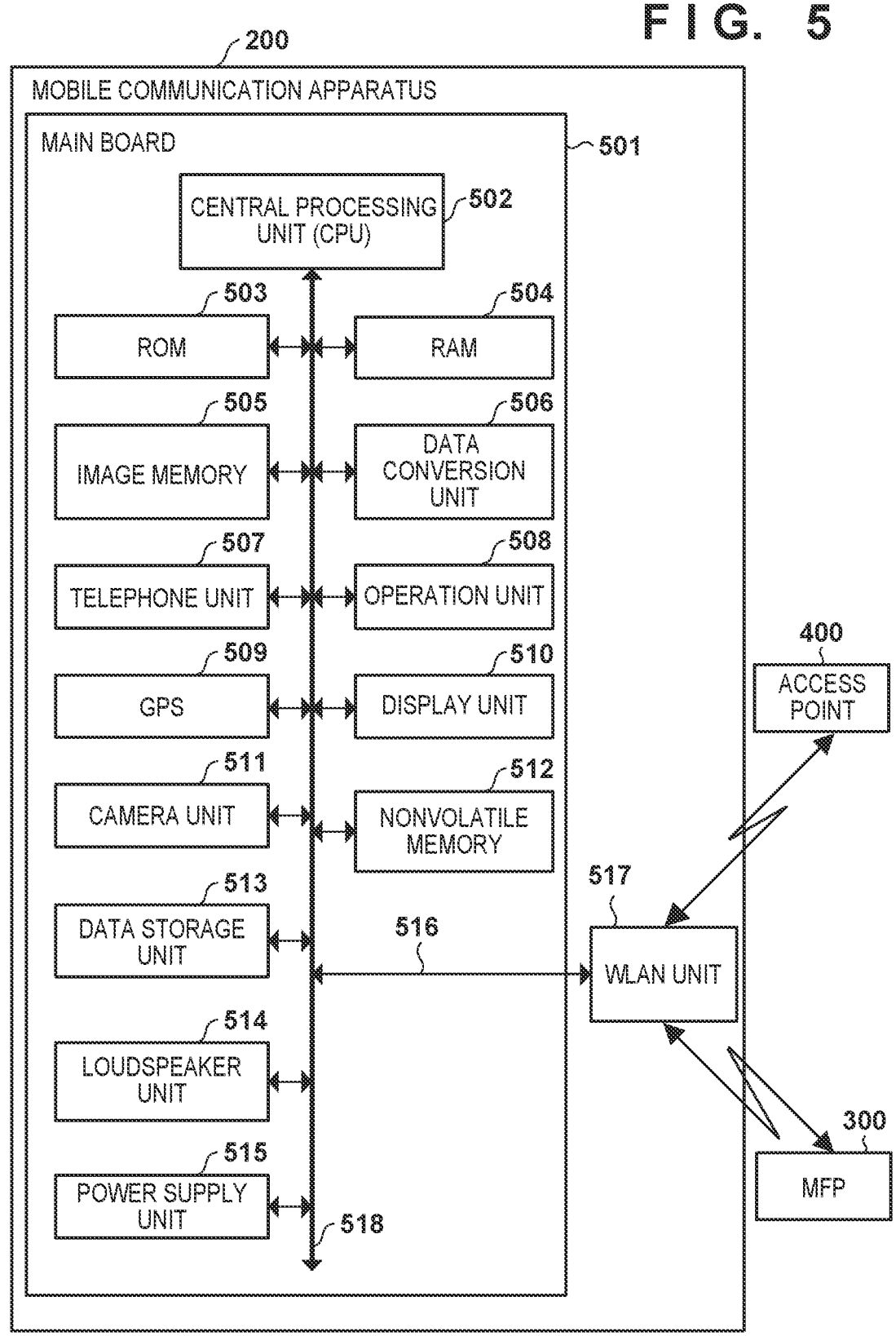
FIG. 5 is a block diagram showing the arrangement of the mobile communication apparatus.

FIG. 5 shows an example of the arrangement of the mobile communication apparatus 200. The mobile communication apparatus 200 includes, in one example, a main board 501 for performing main control of the apparatus itself and a WLAN unit 517 for performing communication by the wireless LAN.

In the main board 501, a CPU (Central Processing Unit) 502 is a system control unit, and controls the overall operation of the mobile communication apparatus 200. The following processing by the mobile communication apparatus 200 is executed under the control of, for example, the CPU 502. Note that the mobile communication apparatus 200 can use an application-specific integrated circuit (ASIC), a field programmable gate array (FPGA), or the like to implement at least some of the functions.

A ROM 503 stores control programs to be executed by the CPU 502, an embedded operating system (OS) program, and the like. In this embodiment, the respective control programs stored in the ROM 503 perform software control such as scheduling and task switching under the management of the embedded OS stored in the ROM 503. A RAM 504 is implemented by an SRAM (Static RAM) or the like, stores data such as program control variables, and stores data such as setting values registered by the user and management data of the mobile communication apparatus 200. The RAM 504 is provided with various work buffer areas. An image memory 505 is implemented by a memory such as a DRAM (Dynamic RAM) and temporarily stores image data received via the WLAN unit 517 and image data read out from a data storage unit 513 that are to be processed by the CPU 502. A nonvolatile memory 512 is formed from a memory such as a flash memory and continues to store data even when the power of the mobile communication apparatus 200 is turned off. Note that such memory structures are not limited to the above-described structures. For example, the image memory 505 and the RAM 504 may have a shared memory structure, or the data may be backed up in the data storage unit 513. Although the image memory 505 has been described as being implemented by a DRAM, it may be implemented by another storage medium such as a hard disk or a nonvolatile memory.

A data conversion unit 506 executes an analysis of data of various formats and data conversion such as color conversion and image conversion. A telephone unit 507 processes speech data input/output via a loudspeaker unit 514 to generate and transmit a speech communication signal to a communication circuit or reconstruct the speech data from a signal received from the communication circuit. An operation unit 508 generates and outputs a signal representing an operation which has been accepted via the operation unit 203 of FIG. 2. A GPS (Global Positioning System) 509 obtains position information such as the current latitude and longitude of the mobile communication apparatus 200. A display unit 510 electronically controls the display contents of the display unit 202 in FIG. 2, displays a screen for various input operations, and displays the operation states, status states, and the like of the MFP 300.

A camera unit 511 has a function of electronically recording and encoding an image input via a lens. Image data related to an image captured by the camera unit 511 is saved in the data storage unit 513. The data storage unit 513 can be a storage device in which various kinds of data are stored as described above. The loudspeaker unit 514 implements the function of inputting or outputting speech for a telephone function and also other functions such as alarm notification and the like. A power supply unit 515 is a battery of a size that can be stored in the mobile communication apparatus 200 and performs power supply control to the apparatus. The mobile communication apparatus 200 can be in one of power supply states including a battery dead state in which the battery has no remaining amount, a power-off state in which the power key 204 is not pressed, an active state in which the apparatus is normally active, and a power saving state in which the apparatus is active but is set in a power saving mode.

The WLAN unit 517 is formed by including an antenna and a communication circuit (for example, a circuit having a baseband processing function and an RF processing function) to perform wireless communication complying with the wireless LAN standard. The mobile communication apparatus 200 performs, via the WLAN unit 517, data communication using the wireless LAN with another device such as an MFP serving as the partner apparatus. The WLAN unit 517 can convert data into packets and perform wireless packet transmission to another device. The WLAN unit can also receive packets wirelessly transmitted from the other external device, reconstruct the original data, and transmit the reconstructed data to the CPU 502.

The respective components of the main board 501 are connected to each other via a system bus 518 managed by the CPU 502. The WLAN unit 517 is connected to the system bus 518 of the main board 501 via a bus cable 516. Therefore, under the control of the CPU 502, data generated or stored by the respective components of the main board 501 are transmitted via the WLAN unit 517, and data received by the WLAN unit 517 are transferred to the respective components of the main board 501.

Note that the mobile communication apparatus 200 can have functions of a general smartphone such as a communication function for cellular communication.

Figure 6:
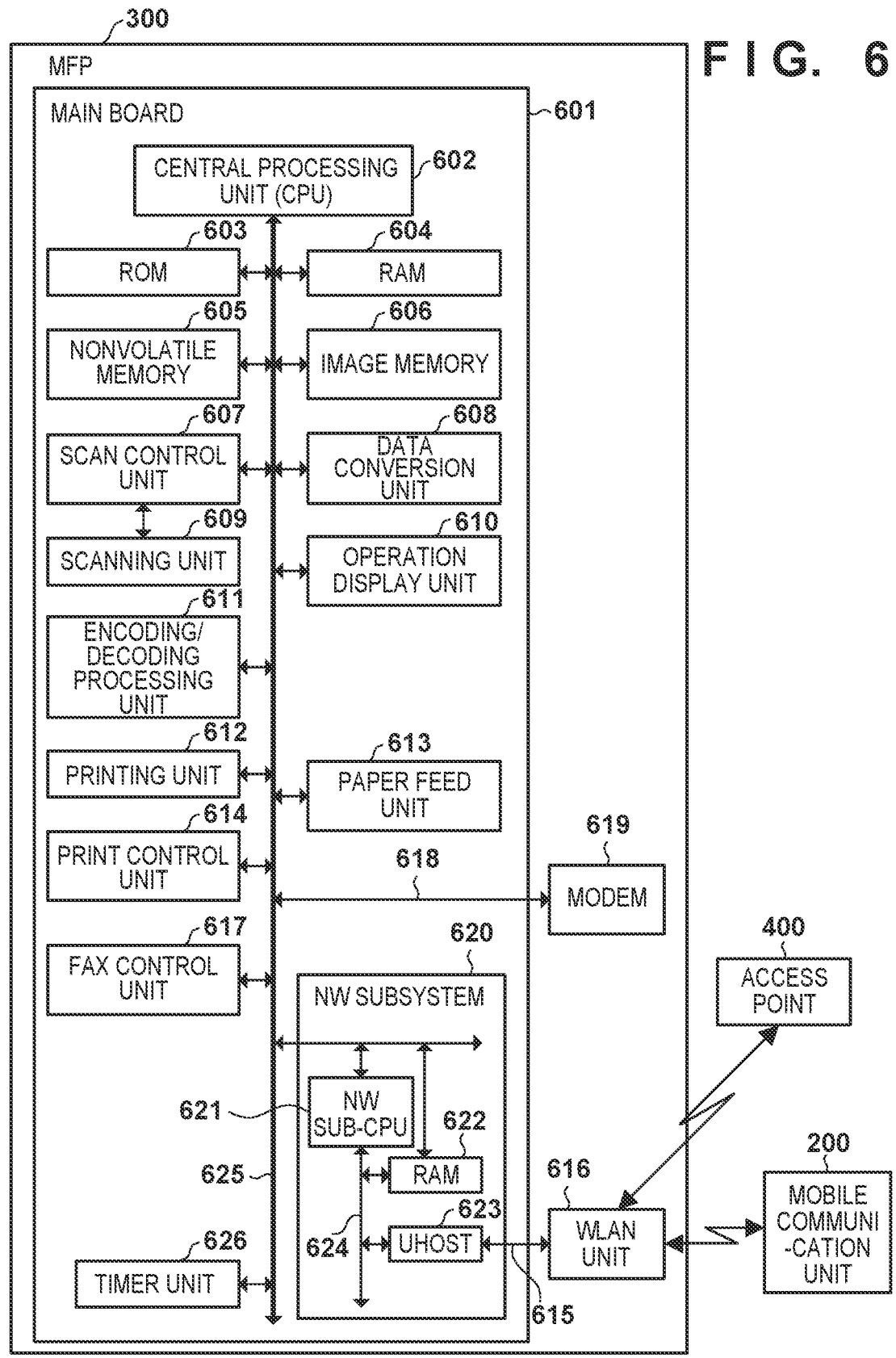
FIG. 6 is a block diagram showing the arrangement of the MFP.

FIG. 6 shows an example of the arrangement of the MFP 300. The MFP 300 includes, in one example, a main board 601 for performing main control of the apparatus itself and a WLAN unit 616 for performing communication by a wireless LAN, and a modem 619 for wired communication.

In the main board 601, a CPU (Central Processing Unit) 602 is a system control unit, and controls the overall operation of the MFP 300. The following processing by the MFP 300 is executed, for example, under the control of the CPU 602. Note that the MFP 300 can use an application-specific integrated circuit (ASIC), a field programmable gate array (FPGA), or the like to implement at least some of the functions.

A ROM 603 stores control programs to be executed by the CPU 602, an embedded operating system (OS) program, and the like. In this embodiment, the respective control programs stored in the ROM 603 perform software control such as scheduling and task switching under the management of the embedded OS stored in the ROM 603. A RAM 604 is implemented by an SRAM (Static RAM) or the like, stores data such as program control variables, and stores data such as setting values registered by the user and management data of the MFP 300. The RAM 604 is provided with various work buffer areas. A nonvolatile memory 605 is formed from a memory such as a flash memory and continues to store data even when the power of the MFP 300 is turned off. An image memory 606 is implemented by a DRAM (Dynamic RAM) or the like and stores image data received via the WLAN unit 616 and image data processed by an encoding/decoding processing unit 611. Also, similarly to the memory structure of the mobile communication apparatus 200, the memory structure of the MFP 300 is not limited to the above-described structure.

A scan control unit 607 controls a scanning unit 609 (for example, a CIS image sensor (contact type image sensor)) to optically scan a document placed on the document table 301 of FIG. 3, and an image signal generated by converting the scanned document into electrical image data is output. At this time, the scan control unit 607 may perform various kinds of image processing such as binarization processing and halftone processing on the image data and output the resultant image data. A data conversion unit 608 executes an analysis of data of various formats, conversion from image data into print data, and the like. A FAX control unit 617 transmits, for example, image data scanned by the scanning unit 609, receives FAX data received from an external apparatus, and performs control to reconstruct an image from the received data. The FAX control unit 617 can, for example, transmit/receive FAX data to/from the external apparatus via the modem 619.

An operation display unit 610 generates a signal representing a user operation accepted via the operation display unit 305 of FIG. 3 and controls the information to be displayed on the operation display unit 305. The operation display unit 610 displays, for example, the screen of FIG. 4A in the initial state, displays a screen as that of FIG. 4B in response to accepting predetermined processing by the user, or can transmit a signal instructing the execution of the predetermined processing to each processing unit in the main board. The encoding/decoding processing unit 611 executes encoding processing and decoding processing and enlargement/reduction processing of image data (JPEG, PNG, or the like) handled by the MFP 300.

A paper feed unit 613 holds paper sheets and supplies paper sheets for printing under the control of a print control unit 614. As the paper feed unit 613, a plurality of paper feed units can be prepared so as to hold a plurality of types of paper sheets in one apparatus. In this case, the print control unit 614 can perform control to select a paper feed unit to be used to supply paper sheets. The print control unit 614 performs various kinds of image processing such as smoothing processing, print density correction processing, and color correction to the print target image data and outputs the processed image data to a printing unit 612. The printing unit 612 can be a circuit and a mechanism functioning as an inkjet printer which prints an image by discharging, from a printhead, ink supplied from an ink tank. The print control unit 614 can also periodically read out the information of the printing unit 612 and perform control to update the information stored in the RAM 604. For example, the print control unit 614 can update status information, such as the remaining amount in an ink tank and the state of the printhead, which are stored in the RAM 604.

A NW (network) subsystem 620 is a subsystem in charge of controlling the input/output related to network communication in order to reduce the control load of the CPU (Central Processing Unit) 602. A control code to be executed by a NW sub-CPU 621 is stored in a part of the RAM 604, and this control code is DMA-transferred from the RAM 604 to a RAM 622 in the subsystem 620 in a boot sequence of the CPU 602. The control code is executed by the NW sub-CPU 621 after the NW sub-CPU 621 is reset. As result, input/output control related to network communication is executed. The respective modules (the NW sub-CPU 621, the RAM 622, and a UHOST module 623) in the NW subsystem are connected to each other via a local bus 624 separate from a system bus 625 of the main board 601. The NW subsystem 620 is capable of performing network control that has minimal influence on other modules in the main board 601 by taking on, among the functions related to network communications, particularly functions of a layer near the hardware layer.

A timer unit 626 is a timer that can measure the time that has elapsed since a predetermined timing. For example, as will be described later, the timer unit 626 measures, from the start of the connection processing of the infrastructure mode, the time that has elapsed without success of the connection processing and can notify the CPU 602 of the elapse of a predetermined time when, for example, the predetermined time has elapsed.

The WLAN unit 616 is the same as the WLAN unit 517 of the mobile communication apparatus 200. Hence, a detailed description will be omitted. The WLAN unit 616 is connected, for example, to the NW subsystem 620 via, for example, the UHOST module 623 and a bus cable 615. The modem 619 is, for example, a functional unit to perform wired communication and is formed by including a circuit and a mechanism for performing data (packet) communication complying with, for example, the IEEE 802.3 standard series. The modem 619 includes, for example, an Ethernet® interface and is connected to a LAN by a cable connected to this interface. This allows communication with an external device such as a PC that has been similarly connected to the LAN. In addition, the modem 619 can communicate with, via the wired LAN, a communication apparatus that is connected to the access point which is connected to the wired LAN. The modem 619 can be connected to the system bus 625 of the main board 601 via a bus cable 618 but may be connected to, for example, the local bus 624 of the NW subsystem 620. Note that the respective components of the main board 601 are connected to each other via the system bus 625 managed by the CPU 602.

(Wireless Connection Method)

In this embodiment, the P2P mode in which a communication apparatus directly communicates with a partner apparatus not via another apparatus and the infrastructure mode in which the communication apparatus indirectly communicates with the partner apparatus via another apparatus such as an access point can be used as the connection methods of the wireless LAN.

The P2P mode can have a plurality of modes. In these modes, for example, the communication apparatus uses a common search request command (for example, a Probe Request frame) between the modes to search for and discover the communication partner apparatus. It is possible to transmit a search request command added with various kinds of attribute information. Normally, if attributes are designated in a search request command, it is recommended that the apparatus which received the search request command transmits a response related to interpretable attributes as widely as possible within the range defined by the specifications of the mode and specifications based on which the mode is defined (Wi-Fi for WFD). Also, in a case in which a piece of uninterpretable information is included in the information (including the aforementioned attributes) added to the search request command, the apparatus which received the search request command can respond based on only information that can be interpreted.

The plurality of modes included in the aforementioned P2P mode can include further modes called a mode A (software AP mode) and a mode B (Wi-Fi Direct mode). For the respective modes, compatible devices may be different, and usable applications may also be different.

FIG. 7 shows an example of the procedure of the wireless connection processing of the mode A (software AP mode). In the software AP mode, one apparatus, out of a communication apparatus and a partner apparatus, functions as a software AP by implementing an access point function by software, and the other apparatus operates as a client that connects to the software AP. Assume that the mobile communication apparatus 200 serves as the client having the role to request various services and that the MFP 300 will serve as the software AP, hereinafter.

In the software AP mode, the client searches for a device which will serve as a software AP by using a search request command 701, and the software AP responds by transmitting a search response 702 to the search request command 701. When the software AP is discovered by the client, the remaining wireless connection processing (establishment of a wireless connection and the like) is performed between the client and the software AP, and then IP connection processing (allocation of IP addresses and the like) is executed. Note that as commands and parameters transmitted/received to establish a wireless connection between the client and the software AP, those which are defined by, for example, the Wi-Fi standard or IEEE 802.11 standard are used, and a description thereof will be omitted.

FIG. 8 shows an example of the procedure of the wireless connection processing of the mode B (Wi-Fi Direct (WFD) mode). Note that a device that can communicate by the WFD mode will invoke a dedicated application to implement this communication function in response to accepting, for example, a user operation via the operation unit of the device. Subsequently, a negotiation to perform WFD communication can be executed based on a user operation of an operation screen serving as a UI (user interface) provided by the application. In the WFD mode, after the communication apparatus searches for a partner apparatus by the search request command, the roles of a P2P Group Owner (GO) and a P2P Client (CL) are decided between the communication apparatus and the partner apparatus, and the remaining connection processing is performed. This role decision can be performed by, for example, a GO Negotiation in the WFD standard.

For example, the communication apparatus transmits a search request command 801 and searches for a partner apparatus to connect by the WFD mode. The partner apparatus responds by transmitting a search response 802 to the received search request command 801. When the partner apparatus is discovered by the communication apparatus, the communication apparatus and the partner apparatus confirm information about services and functions which can be provided to each other (device information confirmation). The services and functions are, for example, a print service, an image display service, a file transmission service, a video streaming service, a video display service, and the like. Note that the device information confirmation is not essential but optional. This device information confirmation phase is performed by, for example, a Service Discovery of the WFD standard. By confirming the device information of each other, the communication apparatus and the partner apparatus can know, before performing the WFD connection, what kind of service can be provided by the other apparatus which is connectable by the WFD mode. When the partner apparatus is discovered by the communication apparatus, an apparatus which is to operate as the P2P Group Owner (GO) and that which is to operate as the P2P Client (CL) are decided. This role decision can be performed by, for example, the GO Negotiation in the WFD standard. In the GO Negotiation, the communication apparatus and the partner apparatus transmit to each other the respective Intent values, which are values set in the respective apparatuses, to compare the magnitudes of the Intent values. Next, as a result of the comparison, the communication apparatus and the partner apparatus decide that the apparatus which has the larger value will operate as the GO and the apparatus which has the smaller value will operate as the CL. If the respective Intent values have the same values, the communication apparatus and the partner apparatus will compare random values (0 or 1) generated after the initial comparison and decide the roles of the GO and the CL. After the roles of the GO and the CL are decided, the communication apparatus and the partner apparatus shift to a parameter exchange phase and exchange parameters to perform WFD communication. Subsequently, the communication apparatus and the partner apparatus perform the remaining wireless connection processing and the IP connection processing based on the exchanged parameters. Note that in the parameter exchange phase, parameters (for example, information used for encrypted communication) concerning the security of the wireless LAN are automatically exchanged by using, for example, a Wi-Fi Protected Setup. As the parameters, for example, an SSID as identification information of a wireless network, an encryption key, an encryption scheme, an authentication key, an authentication scheme, and the like are included.

Figure 9:
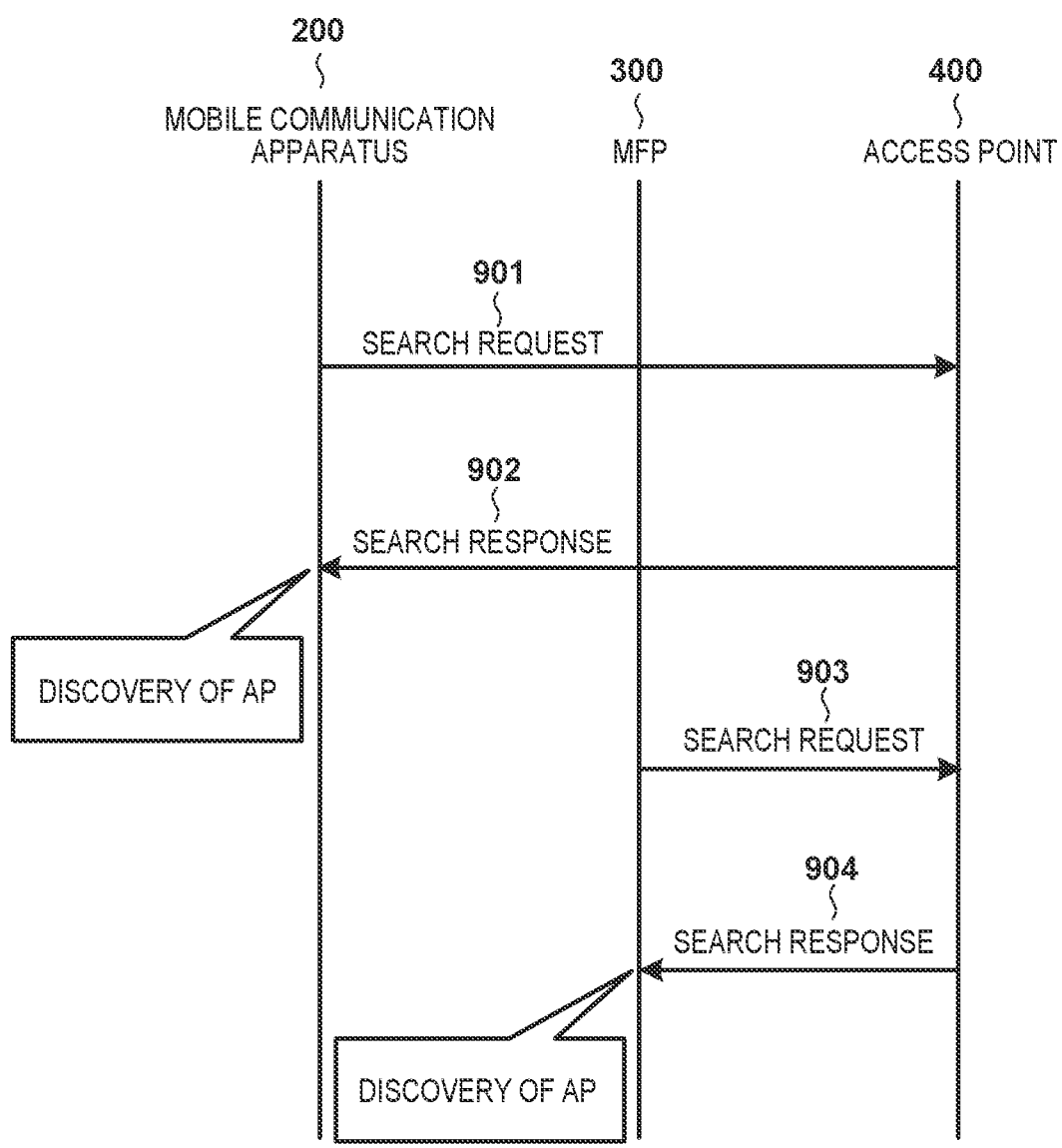
FIG. 9 is a sequence chart showing an example of the procedure of the wireless connection processing of an infrastructure mode.

The infrastructure mode will be described next. FIG. 9 is a sequence chart showing an example of the procedure of the wireless connection processing of the infrastructure mode. In the infrastructure mode, the communication apparatus creates a network, connects to an access point (AP) controlling the network, and communicates with the partner apparatus via the AP. For example, the mobile communication apparatus 200 and the MFP 300 connect to the access point 400 and communicate with each other via the access point 400.

In the infrastructure mode, each communication apparatus searches for an AP by a search request command 901 (search request command 903). The AP responds by transmitting a search response 902 (search response 904) to the received search request command. Next, when the AP is discovered by the communication apparatus, the remaining wireless connection processing (establishment of a wireless connection and the like) and IP connection processing (allocation of IP addresses and the like) are performed between the communication apparatus and the AP. Note that since it is sufficient to use commands and parameters defined by the Wi-Fi standard or IEEE 802.11 standard as the commands and the parameters transmitted/received to establish a wireless connection between the communication apparatus and the AP, and a description thereof will be omitted.

(Channel Decision Processing of Infrastructure Mode and P2P Mode)

When performing wireless communication by concurrently performing the infrastructure mode and the P2P mode, the communication apparatus uses a channel provided from the AP in the infrastructure mode as the common channel for both modes. Hence, wireless communication using both modes can be stably maintained in the communication apparatus. A mode that can concurrently (simultaneously) execute a plurality of communication modes in this manner is called a simultaneous operation mode. The wireless connection of the infrastructure mode is performed using a specific frequency band (wireless channel).

In the infrastructure mode, a station (STA) confirms whether it is possible to wirelessly connect to the AP in a channel usable by the station. Next, the STA specifies the channel which received a response from the AP and decides to use the channel as the subsequent use channel. That is, the AP transmits a response command to the STA only when a request command from the STA arrives in a channel that the AP can use.

In a wireless communication system formed by the AP and the STA, an apparatus which operates as the AP transmits a Beacon signal, and an apparatus which operates as the STA transmits a search request command to the AP upon receiving this beacon signal. The search request command is, for example, a Probe Request frame. The AP does not transmit a response command to a search request command transmitted on a channel other than channels that can be used by the AP itself. Here, the response command is, for example, a Probe Response Frame.

For example, if the channel that can be used by the access point 400 is the nth channel, the access point 400 does not transmit a search response command to the search request command transmitted using the 1st channel. If the MFP 300 determines that no response has been received from the access point 400 due to a timeout or the like after transmitting the search request command using the 1st channel, a search request command is subsequently transmitted using the 2nd channel. The MFP 300 repeats the above-described trial by increasing the channel numbers. When the MFP 300 transmits a search request command using the nth channel, the access point 400 transmits a search response command if the channel is in an unused state.

In the infrastructure mode, the nth channel in which a search response command is returned from the access point in this above-described manner is used in the subsequent wireless communication operation.

The wireless connection of the P2P mode is performed using a specific frequency band (wireless channel). At this time, to stably maintain the wireless communication by the infrastructure mode and the P2P mode, the channel in which a response was received from the AP in the infrastructure mode is obtained and set as the common channel for the GO of the P2P mode.

A channel defined by the Wi-Fi standard is used in each of the infrastructure mode and the P2P mode. In the Wi-Fi standard, 1 to 13 channels can be used as channels of a 2.4 GHz frequency band depending on the country or region. In this embodiment, a description will be given assuming that the range of usable channels is 1 to 13 channels. However, the present invention is not limited to this. That is, although the number of channels may increase in a different frequency band or the channels may be limited to 1 to 11 channels even in the same frequency band depending on the frequency band regulations according to each country or region, the method according to this embodiment is usable in an actually usable channel range. For example, in the IEEE 802.11a wireless LAN standard, a frequency band of 5 GHz is used. Hence, it is known that a range of about 36 to 140 channels can be used. Note that for a communication apparatus using both frequency bands 2.4 GHz (1 to 13) and 5 GHz (36 to 140), this means that the number of channels to transmit a search request command to the AP will increase.

(Processing Procedure)

Figure 10:
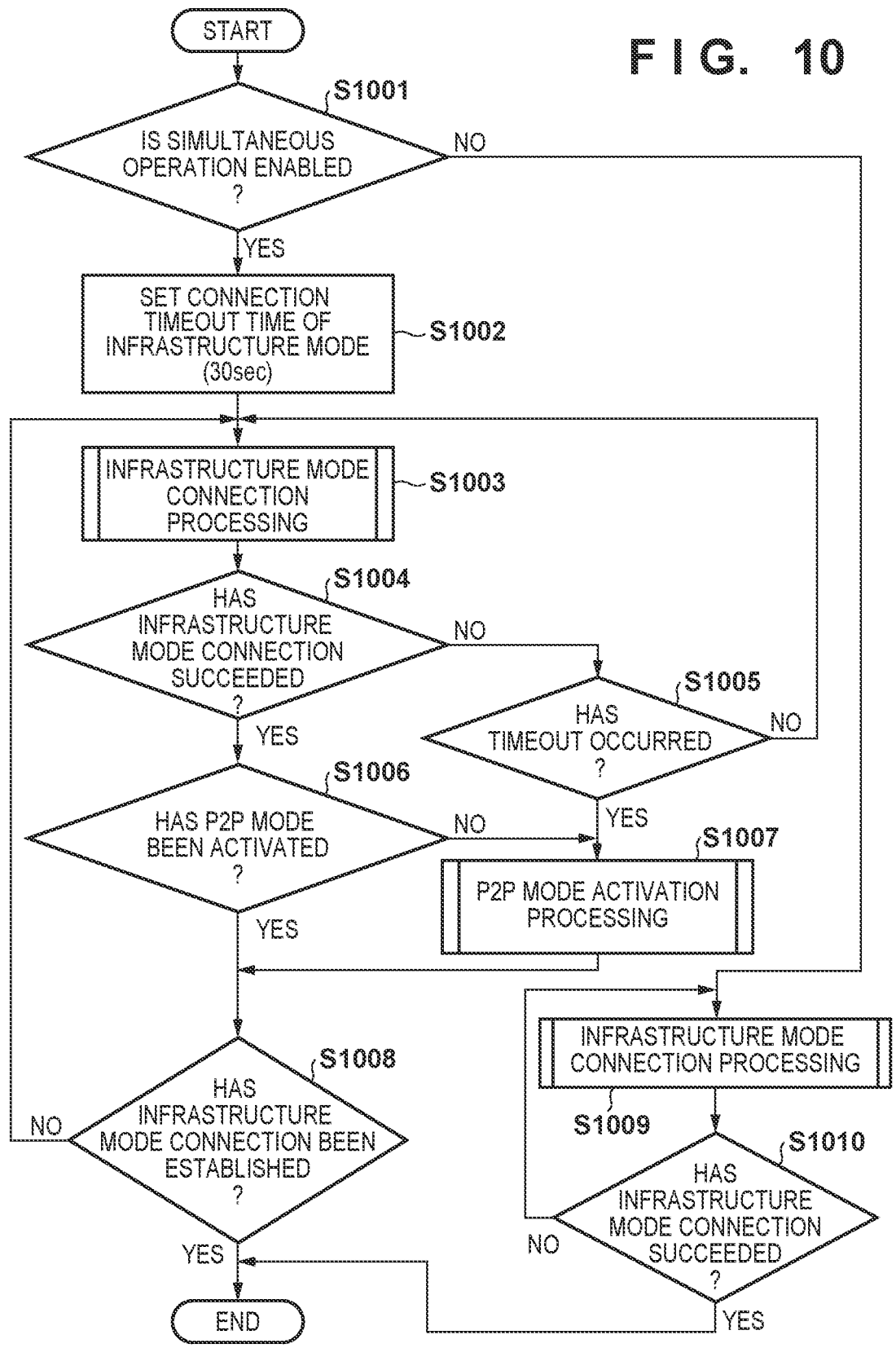
FIG. 10 is a flowchart showing the procedure of processing when a wireless LAN is activated.

An example of the procedure of the processing to be executed in this embodiment will be described next. FIG. 10 shows an example of the procedure of the processing when the wireless LAN is activated in the MFP 300. Note that although the procedure of the processing of the MFP 300 will be described in this embodiment, the same processing may be executed by the mobile communication apparatus 200. Note that each step of FIG. 10 is implemented when, for example, the CPU 602 of the MFP 300 loads a control program stored in a memory such as the ROM 603 to the RAM 604, and executes the program. Additionally, the flowchart of FIG. 10 starts when, for example, a trigger such as a wireless LAN connection start instruction by the operation unit or a power on is generated in the MFP 300.

In this processing, the MFP 300 first determines whether the simultaneous operation mode has been enabled (step S1001). If the simultaneous operation mode has not been enabled (NO in step S1001), the MFP 300 executes the connection processing of the infrastructure mode (step S1009). In response to the connection processing in the infrastructure mode succeeding (YES in step S1010), the MFP 300 ends the processing according to the flowchart of FIG. 10. In this case, while the connection processing in the infrastructure mode does not succeed (NO in step S1010), the MFP 300 repetitively executes the connection processing (step S1009). Note that it may be configured so that the MFP 300 executes the connection processing only in the P2P mode. That is, the MFP 300 may select, in step S1001, whether the operation mode is to be the simultaneous operation mode, the infrastructure mode, or the P2P mode, and may perform a different process for each mode in accordance with the determination result. For example, if the operation mode is the simultaneous operation mode, the MFP 300 advances the process to step S1002. If the operation mode is the infrastructure mode, the process advances to step S1009. If it is the P2P mode, the process can advance to P2P mode activation (connection) processing (not shown).

On the other hand, if the simultaneous operation mode has been enabled (YES in step S1001), the MFP 300 sets a connection timeout time (for example, 30 sec) of the infrastructure mode and stores the set time in the RAM 604 in the MFP 300 (step S1002). Note that the connection timeout time in this case can be set shorter than that used for the connection processing in the infrastructure mode when the MFP 300 is set to perform communication using only the infrastructure mode. For example, in a case in which the timeout time is 1 min when the MFP 300 is set to perform communication using only the infrastructure mode, the timeout time can be set to 30 sec if the simultaneous operation mode is enabled. Additionally, if the timeout time is not set (is nominally infinite) when the MFP 300 is set to perform communication using only the infrastructure mode, a finite timeout time can be explicitly set when the simultaneous operation mode is enabled. FIG. 10 illustrates a case in which the timeout time is not set (is nominally infinite) when it is set so as to perform communication by only the infrastructure mode. That is, the example shows how processes are repeated until step S1009 succeeds without determination of a timeout when "NO" is determined in step S1010. However, it may be set so that the processing ends by an error if the connection processing in the infrastructure mode does not succeed within a predetermined time set as the timeout time when "NO" is determined in step S1010 and a timeout has been determined. In this case, the timeout time can be set longer than the timeout time set in step S1002.

The MFP 300 executes the connection processing of the infrastructure mode (step S1003) and monitors whether the processing has succeeded (step S1004). Note that the MFP 300 sets the initial value to 0 sec and starts a time measurement by using the timer unit 626 upon starting the connection processing of the infrastructure mode.

If the elapsed time without succeeding in the connection since the start of the connection processing reaches the connection timeout time stored in the RAM 604 (NO in step S1004 and YES in step S1005), the MFP 300 generates a timeout event through the timer unit 626 and stops the time measurement. In this case, the MFP 300 executes the activation processing of the P2P mode (step S1007).

On the other hand, if the connection processing by the infrastructure mode succeeds (YES in step S1004), the MFP 300 stops the time measurement by the timer unit 626. Next, the MFP 300 determines whether the P2P mode has been activated (step S1006). If the P2P mode has not been activated (NO in step S1006), the MFP 300 executes the activation processing of the P2P mode (step S1007).

After the activation processing of the P2P mode (step S1007), the MFP 300 shifts the process to step S1008. In addition, if it is determined that the P2P mode has been activated in step S1006 (YES in step S1006), the MFP 300 shifts the process to step S1008.

In step S1008, the MFP 300 determines whether a connection has been established by the infrastructure mode (step S1008). Since when it is determined that a timeout has occurred in step S1005, a connection by the infrastructure mode has not been established (NO in step S1008), the MFP 300 returns the process to step S1003 and re-executes the connection processing of the infrastructure mode. On the other hand, if it is determined that a connection has been established by the infrastructure mode (YES in step S1008), the MFP 300 ends the activation processing of the wireless LAN.

Note that the MFP 300 can change the setting of the P2P mode if it is determined that the P2P mode has been activated in step S1006 and if it is determined that a connection by the infrastructure mode has been established in step S1008. For example, the settings of the P2P mode can be changed so that the wireless channel which is to be used in the P2P mode will match the wireless channel which is to be used in the infrastructure mode. Note that since the determination in step S1006 is performed if the connection processing in the infrastructure mode has succeeded, changes to the settings of the P2P mode as described above may be performed when the P2P mode is determined to be activated in the determination in step S1006.

As described above, according to the processing of FIG. 10, if the simultaneous operation mode has been enabled, a timeout time for the connection processing of the infrastructure mode can be set so that the P2P mode is activated when the timeout time has elapsed without a successful connection. This can prevent the P2P mode from not being activated at all due to the incompletion of the connection processing of the infrastructure mode. Also, a timeout time can be set when the infrastructure mode is operating in a single operation mode. However, in this case, the activation of the P2P mode can be quickened by shortening the timeout time of the connection processing of the infrastructure mode in the case of the simultaneous operation mode. This allows the P2P mode to be activated even if a connection by the infrastructure mode cannot be established or requires time to be established when the power of the access point is turned off or when it is immediately after the activation of the access point.

Note that the timeout time when the infrastructure mode is operating in a single operation mode can be set shorter than the timeout time of the connection processing of the infrastructure mode in the case of the simultaneous operation mode. This can increase the probability that the connection by the infrastructure mode will be in an established state until the point when the P2P mode is activated.

Note that, as described above, the processing described in this embodiment can be executed by the mobile communication apparatus 200. That is, if it is a communication apparatus that can perform simultaneous communication by the infrastructure mode and the P2P mode, the above-described processing can be executed. In addition, although the infrastructure mode and the P2P mode were described as the examples in the above-described embodiment, the present invention is not limited to them. That is, the above-described processing is applicable to a communication apparatus capable of simultaneous communication in a plurality of communication modes.

According to the present invention, the influence of the connection processing of one communication mode on the connection processing of another communication mode in a communication apparatus capable of communicating in a plurality of modes can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:
one or more processors;
a communication unit configured to perform first communication with a partner apparatus via another apparatus forming a wireless network, and a second communication with the partner apparatus without via the another apparatus; and
one or more memories including instructions that, when executed by the one or more processors, cause the printing apparatus to:
accept a user instruction to perform setting regarding communication of the printing apparatus, wherein the setting includes setting to enable or disable the first communication and setting to enable or disable the second communication;

in a case where the setting of the first communication is set to be enabled by the accepted user instruction and the setting of the second communication is set to be enabled by the accepted user instruction, stop a function for the first communication and activate a function establishing a connection for the second communication according to elapse of a first predetermined time without establishing the first communication from a start of a search processing for searching for an access point for the first communication; and in a case where the setting of the first communication is set to be enabled by the accepted user instruction and the setting of the second communication is set to be disabled by the accepted user instructions, continue executing the search processing, even after elapsing the first predetermined time without establishing the first communication from the start of the search processing.

2. The printing apparatus according to claim 1, wherein the printing apparatus performs the first communication and the second communication simultaneously in a case where the printing apparatus receives a certain operation regarding communication.

3. The printing apparatus according to claim 1, wherein the first communication is wireless communication by a wireless Local Area Network (LAN) complying with Institute of Electrical and Electronics Engineers (IEEE) 802.11 standard series.

4. The printing apparatus according to claim 1, wherein the first communication is wireless communication by an infrastructure mode of a wireless Local Area Network (LAN) complying with Institute of Electrical and Electronics Engineers (IEEE) 802.11 standard series.

5. The printing apparatus according to claim 1, wherein another apparatus is an access point for performing wireless communication by a wireless Local Area Network (LAN) complying with Institute of Electrical and Electronics Engineers (IEEE) 802.11 standard series.

6. The printing apparatus according to claim 1, wherein the second communication is based on Wi-Fi Direct standard.

7. The printing apparatus according to claim 1, wherein the second communication is communication with the partner apparatus functioning as an access point performing wireless communication by a wireless Local Area Network (LAN) complying with Institute of Electrical and Electronics Engineers (IEEE) 802.11 standard series.

8. A control method of a printing apparatus including a communication unit configured to perform a first communication with a partner apparatus via another apparatus forming a wireless network, and a second communication with the partner apparatus without via the another apparatus, the control method comprising:
accepting a user instruction to perform setting regarding communication of the printing apparatus, wherein the setting includes setting to enable or disable the first communication and setting to enable or disable the second communication;
in a case where the setting of the first communication is set to be enabled by the accepted user instruction and the setting of the second communication is set to be enabled by the accepted user instruction, stop a function for the first communication and activating a function establishing a connection for the second communication according to elapse of a first predetermined time without establishing the first communication from a start of a search processing for searching for an access point for the first communication; and in a case where the setting of the first communication is set to be enabled by the accepted user instruction and the setting of the second communication is set to be disabled by the accepted user instructions, continuing executing the search processing, even after elapsing the first predetermined time without establishing the first communication from the start of the search processing.

9. A non-transitory computer-readable storage medium that stores a computer program for causing a computer of a printing apparatus including a communication unit configured to perform a first communication with a partner apparatus via another apparatus forming a wireless network, and a second communication with the partner apparatus without via the another apparatus, to:

accept a user instruction to perform setting regarding communication of the printing apparatus, wherein the setting includes setting to enable or disable the first communication and setting to enable or disable the second communication;

in a case where the setting of the first communication is set to be enabled by the accepted user instruction and the setting of the second communication is set to be enabled by the accepted user instruction stop a function for the first communication and activate a function establishing a connection for the second communication according to elapse of a first predetermined time without establishing the first communication from a start of a search processing for searching for an access point for the first communication; and in a case where the setting of the first communication is set to be enabled by the accepted user instruction and the setting of the second communication is set to be disabled by the accepted user instruction, continue executing the search processing, even after elapsing the first predetermined time without establishing the first communication from the start of the search processing.

10. The printing apparatus according to claim 1, the instruction further cause the printing apparatus to receive at least one of a first user instruction for enabling or disabling the first communication and a second user instruction for enabling or disabling the second communication.

11. The printing apparatus according to claim 10, the instruction further cause the printing apparatus to, in a case where the printing apparatus receives the first user instruction and the second user instruction, determine to be allowed to perform the first communication and the second communication simultaneously.

12. The printing apparatus according to claim 1, the instruction further cause the printing apparatus to determine a channel used for the second communication based on a channel used for the first communication.

13. The printing apparatus according to claim 1, the instruction further cause the printing apparatus to activate the second communication in a case the first communication is established.

14. The printing apparatus according to claim 1, wherein the search processing includes processing for detecting an access point apparatus.

15. The printing apparatus according to claim 1, the instruction further cause the printing apparatus to suspend executing the search processing in a case where a second predetermined time has elapsed without establishing the first communication from a start of the connection processing in a case where upon condition that the setting of the first communication is set to be enabled by the accepted user instruction and the setting of the second communication is set to be disabled by the accepted user instructions.

16. The printing apparatus according to claim 15, wherein the second predetermined time is longer than the first predetermined time.

17. The printing apparatus according to claim 1, wherein the instruction further cause the printing apparatus to, in a case where the first communication and the second communication are enabled by the received user instruction, activate a function for the second communication according to elapse of the first predetermined time without establishing the first communication from a start of a search processing for searching for an access point for the first communication upon the activation of the printing apparatus.

18. The printing apparatus according to claim 1, wherein the instruction further cause the printing apparatus to, in a case where the first communication and the second communication are enabled by the received user instruction, activate a function for the first communication before activating a function of the second communication upon the activation of the printing apparatus.

19. The printing apparatus according to claim 1, wherein the instruction further causes the printing apparatus to, upon performing connection processing with the another communication apparatus in a case where the function for establishing a connection for the second communication is activated, perform Group Owner (GO) Negotiation in Wi-Fi Direct standard.

20. The printing apparatus according to claim 1, wherein in a case where wherein upon condition that the setting of the first communication is set to be enabled by the accepted user instruction and the setting of the second communication is set to be disabled, the printing apparatus executes control for continuously executing the search process for searching the access point without timing out.

* * * * *